May 6, 1941.   O. J. CROWE   2,240,491
MOLDING
Filed Jan. 20, 1938
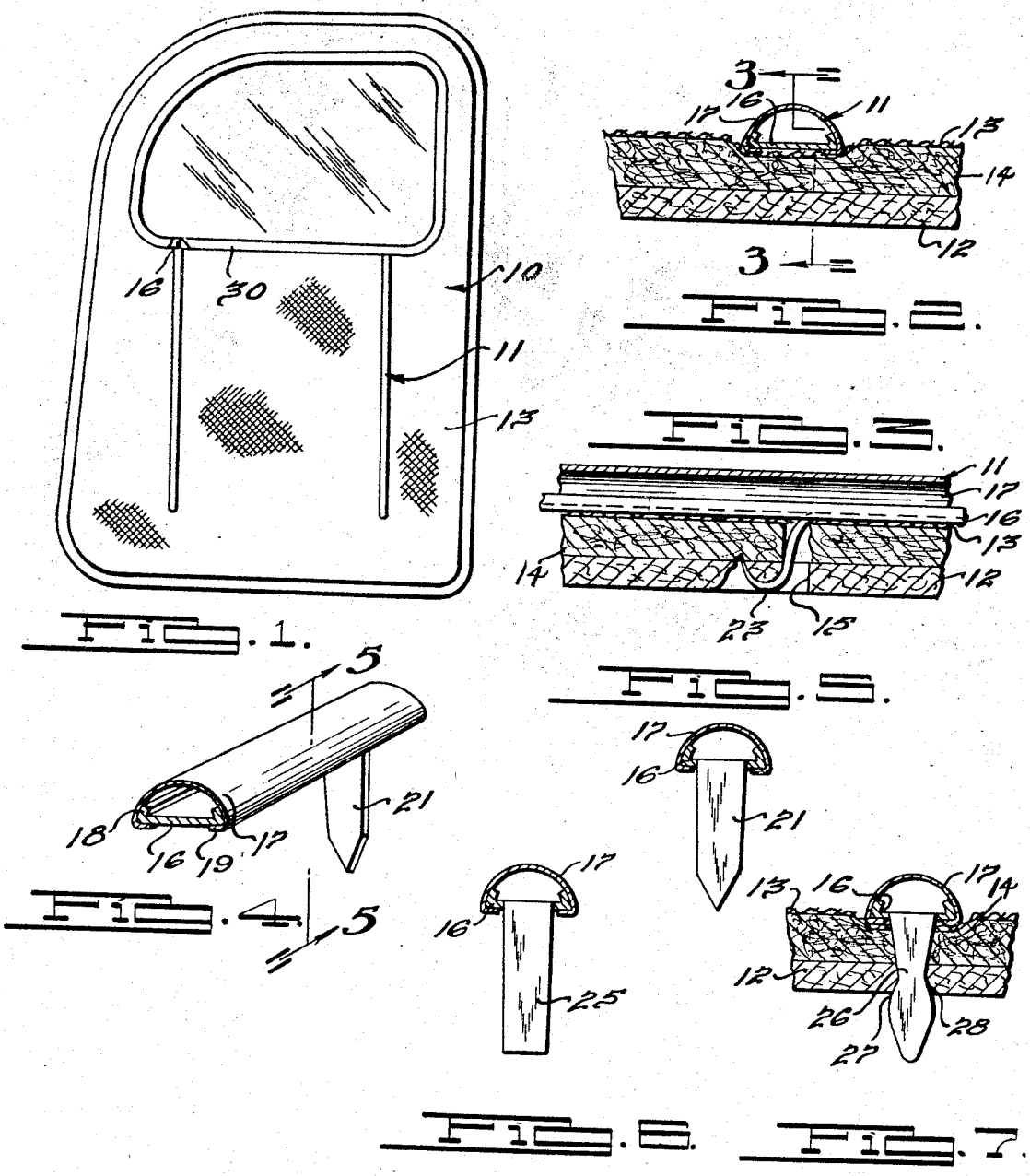

Patented May 6, 1941

2,240,491

UNITED STATES PATENT OFFICE 2,240,491

MOLDING

Orley J. Crowe, Detroit, Mich., assignor to Herron-Zimmers Moulding Company, a corporation of Illinois Application January 20, 1938, Serial No. 185,833

1 Claim. (Cl. 189—88)

The invention relates generally to molding and it has particular relation to molding for use on automobile bodies.

The use of molding on automobile bodies and other structures for the purpose of ornamentation is quite general and owing to the large number of automobiles manufactured, the production of the molding necessarily must be of large volume. This molding ordinarily is manufactured from strip steel which passes between rollers for fashioning the strip to the shape desired, and then the molding is cut into proper lengths. In connection with molding of this character, one problem that continually arises is that of fastening it on the automobile body or other structure in an inexpensive manner and at present the most widely used fastening means comprises separate and so-called hairpin fastening elements that are assembled with the molding after the latter is manufactured. Ordinarily these hairpin fasteners are constructed of wire and aside from the cost of manufacturing them, some time is required in separately assembling and properly placing them along the molding. While other types of fastening means have been employed, usually the expense thereof has been relatively large.

One of the principal objects of the present invention is to provide a molding that costs substantially less to manufacture.

Another object of the invention is to provide molding having improved means for fastening it in place and which enables manufacturing the molding efficiently and inexpensively.

Other objects of the invention will become apparent from the following specification, from the claim hereinafter set forth, and from the drawing to which the specification relates.

For a better understanding of the invention, reference may be had to the drawing wherein:

Fig. 1 illustrates the inner side of an automobile door having molding applied thereto as constructed according to one form of the invention;

Fig. 2 is a cross-sectional view on a larger scale, taken substantially along the line 2—2 of Fig. 1;

Fig. 3 is a cross-sectional view taken substantially along the line 3—3 of Fig. 2;

Fig. 4 illustrates a section of the molding as seen prior to its application;

Fig. 5 is a cross-sectional view taken substantially along the line 5—5 of Fig. 4;

Figs. 6 and 7 illustrate structures similar to that shown by Fig. 5, with the exception that the struck-out prongs are of different shape.

While the molding forming the subject matter of the present invention may be applied in many places, it has been particularly applied to automobiles on the inner side of the doors and below the windows. Pursuant to this, an automobile door is indicated at 10 having molding applied thereto below the window, as indicated at 11. It will be recognized that ordinarily the inner side of such a door is covered by fibre board that in turn is covered by padding and an outer covering of fabric and as shown by Figures 2 and 3, this fibre board is indicated at 12, the padding at 14, and the fabric covering therefor at 13. For applying molding to this cover, the latter, prior to application of the molding, is provided with spaced openings 15 that extend through the fibre board, padding, and fabric and the molding is fastened to the cover by fastening means passing through these openings. It will be apparent from this that the molding has a plurality of fastening means placed along its length that are equal in number and spaced according to its length that are equal in number and spaced according to the openings.

As best shown by Figure 4, the molding comprises an inner base strip of metal 16 and an outer metal cover 17 which is held on the inner strip. The inner strip 16 is generally flat, but its edges are provided with upturned short flanges 18. While the cover 17 may vary in shape, depending upon the ornamental effect desired, it is shown as being substantially semi-circular in shape and having inturned edges 19 that extend under the edges of the strip 16. It will be observed that the flanges 18 on the inner strip are shaped substantially to fit against the inner surface of the cover 17 and in view of the engagement of the edges 19 with the under side of the edges of strip 16, it will be seen that relative movement of the cover and inner strip 16 in directions transverse to their length is prevented. In production, it is preferable that the inner strip 16 be constructed of relatively heavy but malleable steel, such as cold rolled steel, as this is relatively inexpensive and yet very satisfactory for fastening the molding in place and providing a means for holding the cover 17. On the other hand, the outer cover 17, due to the fact that it provides the ornamentation, preferably is constructed of material such as stainless steel, and due to its association with the inner strip 16, the cover may be constructed of relatively thin stock, and this is desirable because stainless steel is more expensive.

For the purpose of fastening the molding as thus assembled to the door cover previously described, prongs 21 are struck from the inner strip 16 and these are spaced longitudinally of the molding in accordance with the opening 15 in such door cover. These prongs are struck from the inner strip prior to assembling the cover 17 therewith and the cover as shown then is assembled with the inner strip by telescoping the strips longitudinally. It may be mentioned in this connection that the inturned edges 19 on the cover 17 may be much shorter than are shown, so that it would not be necessary to assemble the strips by telescoping them longitudinally, but instead the cover might be snapped on the inner strip 16 by pressing the cover 17 downwardly and causing such edges 19 to ride over the flanges 18 until such edges snap under the edges of the inner strip.

With the parts assembled, and with the prongs 21 projecting in the manner shown by Figure 4, the assembly is placed over the door cover with the prongs aligned with the openings 15, and then the molding is pressed against the door cover so that the prongs move through such openings. With the molding against the door cover, the prongs may be bent over against the inner side of the fibre board, as indicated at 23, so as to firmly lock the molding in place.

It may be noted that the molding, as thus applied, serves additionally to hold the fibre board, padding, and fabric together.

Figures 6 and 7 vary from constructions that have been described in the shape of the prongs. Figure 6 shows a rectangular prong 25 and in certain instances, this type of prong would be desirable. Figure 7 shows a prong having a narrower portion 26 intermediate its ends, which provides shoulders 27 and 28 that serve to hold the prongs against removal once they have been pushed through openings in the fibre board. In this connection, the openings might be sufficiently small that when the prongs are pressed therethrough, the shoulders 27 and 28 sufficiently prevent reverse movement of the prongs that the molding will be held in place. It will be appreciated that in certain applications, it might not be necessary or possible to bend over the inner ends of the prongs and thus prongs that would automatically lock themselves in the openings in the fibre board would be desirable, as then it would be only necessary to push the molding into its proper place.

It may be added that the cover 17 may be of such original contour that assembly thereof with strip 16 presses the sides of the cover a little further apart. This causes the cover to resiliently grip the inner strip. Again it may be added that in applying the molding, it may be preferable in some instances to have the inner strip 16 projecting beyond the cover 17 at one end and under the garnish molding, indicated at 30. The latter will anchor the end of the strip 16 and a neat appearance results in having the cover terminate in flush contact with the garnish molding.

The invention provides a much simpler and less expensive molding, and it will be appreciated that it lends itself efficiently to large volume production. It is apparent that the cover strip can be manufactured efficiently, and similarly, it is clear that the inner strip may be inexpensively fashioned. After fashioning the inner strip, it is only necessary to strike out the prongs and assemble the cover therewith. Application of the molding, such as to the inner side of the door, may be effected simply, as it is only necessary to bend over the inner ends of the prongs or, as in the case of the one construction described, to merely press the prongs through the openings.

Although more than one form of the invention has been described and illustrated in detail, it will be apparent to those skilled in the art that various modifications may be made without departing from the scope of the appended claim.

What is claimed is:

Molding in the form of an article of manufacture, comprising an elongated base strip of metal having a substantially flat base and short laterally curved edge flanges projecting from one side of the base in an outward but converging manner, prongs struck from the base and projecting from the opposite side thereof in longitudinally spaced relation with said prongs disposed in substantially perpendicular relation to the base and having substantially sharp ends, and a metal cover element substantially thinner than the base strip extending longitudinally over the first mentioned side of the base and having its side portions curved and substantially fitting the curved side edge flanges and having its edges turned under and engaging said opposite side of the base, the engagement between the side portions of the cover and the side edge flanges of the base in conjunction with the engagement of the turned under edges of the cover with said opposite side of the base serving to hold the parts positively together before application of the molding, also serving to enable the use of strong pressure on the outer surface of the cover when the molding is applied to a surface, and also serving to positively hold the cover on the base after the molding is applied due to contact of the turned in edges with said surfaces.

ORLEY J. CROWE.